United States Patent [19]
Feuchter et al.

[11] Patent Number: 6,050,911
[45] Date of Patent: *Apr. 18, 2000

[54] INFINITELY VARIABLE SPEED TRANSMISSION HAVING TWO V-BELT PULLEYS

[75] Inventors: Harald Feuchter, Stuttgart; Ottmar Back, Waiblingen, both of Germany

[73] Assignee: DaimlerChrysler AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/697,128

[22] Filed: Aug. 20, 1996

[30] Foreign Application Priority Data

Aug. 21, 1995 [DE] Germany ............... 195 30 615

[51] Int. Cl.⁷ ............... F16H 59/16; F16H 59/70
[52] U.S. Cl. ............... 474/12; 474/14; 474/18; 474/19
[58] Field of Search ............... 474/8, 12, 14, 474/18, 19, 28

[56] References Cited

U.S. PATENT DOCUMENTS

| | | | |
|---|---|---|---|
| 3,600,960 | 8/1971 | Karig ............... | 474/12 |
| 3,893,343 | 7/1975 | Zaiser et al. ............... | 474/12 |
| 4,173,156 | 11/1979 | Horowitz et al. ............... | 474/12 |
| 4,322,798 | 3/1982 | McCoin ............... | 476/3 X |
| 4,370,139 | 1/1983 | Zigler ............... | 474/45 |
| 4,541,821 | 9/1985 | Sakakibara ............... | 474/17 |
| 4,735,598 | 4/1988 | Moroto et al. ............... | 474/29 |
| 5,108,348 | 4/1992 | Bornmann ............... | 474/28 X |
| 5,279,523 | 1/1994 | Schonnenbeck ............... | 474/28 |
| 5,279,525 | 1/1994 | Rattude ............... | 474/28 X |
| 5,378,198 | 1/1995 | Moroto et al. ............... | 474/8 |

FOREIGN PATENT DOCUMENTS

| | | |
|---|---|---|
| 2 012 732 | 10/1971 | Germany. |
| 17248/1993 | 2/1983 | Japan. |
| 222648/1985 | 4/1984 | Japan. |
| 27755/1988 | 8/1986 | Japan. |
| 297850/1988 | 5/1987 | Japan. |
| 2-300550 | 12/1990 | Japan. |
| 5-96596 | 12/1993 | Japan. |

OTHER PUBLICATIONS

VDI Report, 579, 1986, pp. 125–150 (German).
"Study on Axial Force and Its Distribution for a Newly Developed Block–Type CVT–Belt," *International Journal of Vehicle Design*, vol. 12, No. 3, 1991, pp. 324–335.
"Operating Behavior of CVT–Belt Drives for the Driving of Automobiles," Dissertation of Dipl. –Ing. Alexander Pietz, Hannover University, Hannover, 1993.

*Primary Examiner*—Roger Schoeppel
*Attorney, Agent, or Firm*—Evenson, McKeown, Edwards & Lenahan, P.L.L.C.

[57] ABSTRACT

An infinitely variable speed transmission in which the transmission ratio results from the equilibrium of the total contact pressure force on the one V-belt pulley and the contact pressure force on the other V-belt pulley determined by a V-belt. The total contact pressure force having a torque-dependent proportion and a proportion which is a function of at least one outside operating parameter.

11 Claims, 1 Drawing Sheet

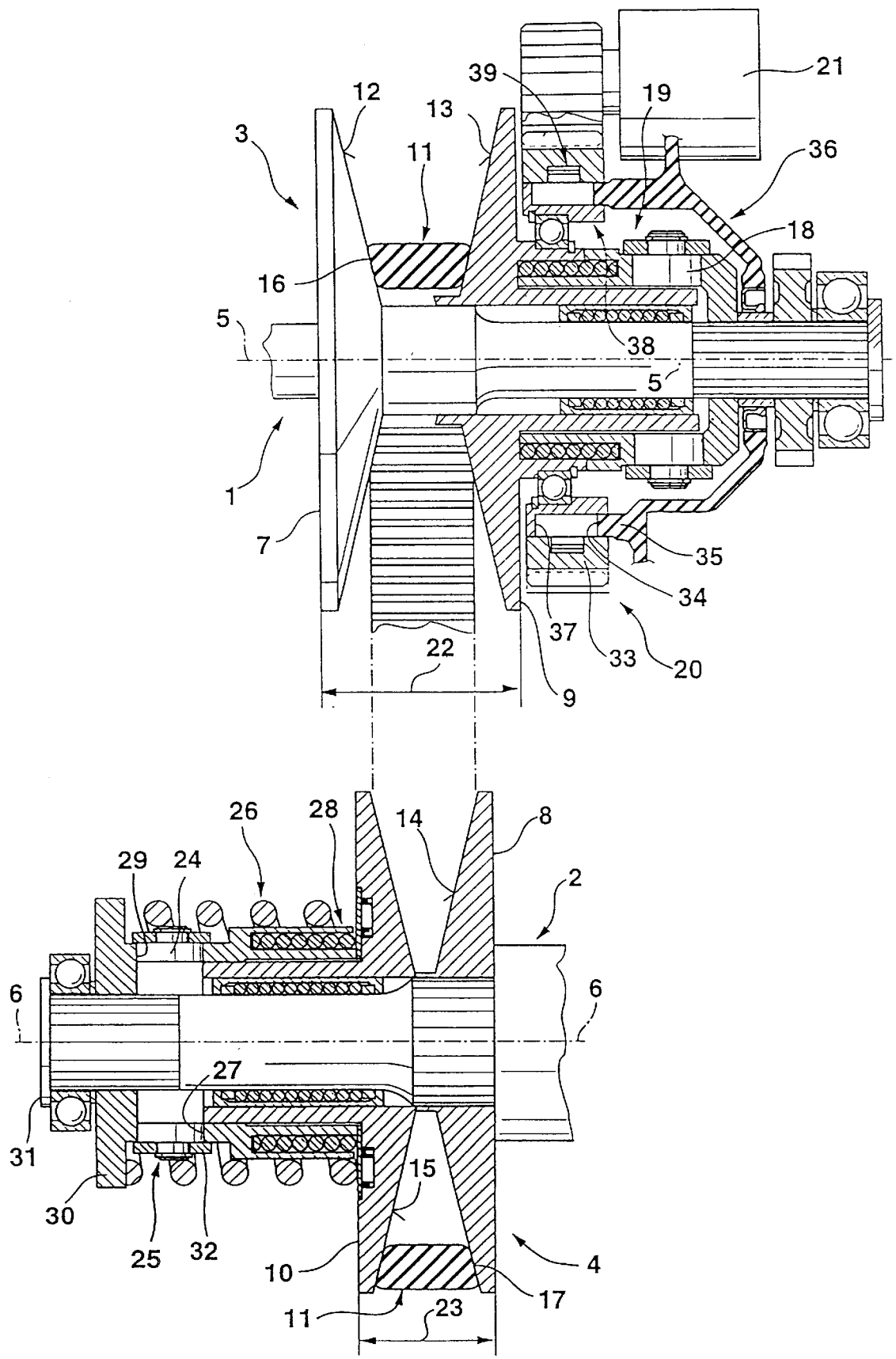

INFINITELY VARIABLE SPEED TRANSMISSION HAVING TWO V-BELT PULLEYS

BACKGROUND AND SUMMARY OF THE INVENTION

This invention relates to an infinitely variable speed transmission, and more particularly to an infinitely variable speed transmission having two V-belt pulleys which each have an axially stationary pulley part and an axially movable pulley part, a continuous V-belt being wound around the two V-belt pulleys, each V-belt pulley having an adjusting device which changes the distance between the two pulley parts to adjust the respective transmission ratio, and one of the V-belt pulleys having an adjusting device for generating torque-dependent axial contact pressure forces.

In the case of a transmission of the type generally described above known from Sakakibara, U.S. Pat. No. 4,541,821, the transmission ratio is adjusted by an adjusting device assigned to each V-belt pulley which adjusting device determines the mutual distance between the two pulley parts on both V-belt pulleys pertaining to the desired ratio. This arrangement is effectively a position control. Only one of the two V-belt pulleys has an additional adjusting device for providing torque-dependent contact pressure forces. This requires that the contact pressure of the V-belt on the other V-belt pulley must be caused by higher tensile forces of the V-belt which are finally generated by the torque-dependent adjusting device of one V-belt pulley and must be transmitted by the V-belt to the other V-belt pulley.

Infinitely variable speed transmissions in motor vehicles meet requirements which cannot be met by manual transmissions and by conventional automatic transmissions. The known advantages of an infinitely variable speed transmission, such as the improvement of the fuel consumption, the adaptation of the transmission ratio to the available power provided by the tensile-force hyperbola, the reductions of both the emissions and of the noise continually increase the significance of this transmission construction.

Concerning the implementation of this transmission form, the wind-around transmissions are attested to have the most balanced characteristics (*VDI Report* 579, 1986, Pages 125–150).

The infinitely variable wind-around transmissions so far used in motor vehicles are almost exclusively wet-operating chain drives according to Reimers or slide member belts according to the Van Doorne principle. As the result of the transmission of the peripheral force by way of boundary friction at the contact points between the wind-around medium and the adjusting pulleys and the resulting low coefficient of friction, these transmissions require high contact pressure forces. Although, because of the lubricating gap between the wind-around device and the pulley, an adjustment of the transmission during stoppage is possible, the disadvantage of this arrangement is the fact that for the buildup of an adjusting force or maintaining a contact pressure force, a pump is always required for generating the required contact pressure at the pulleys. Particularly in the case of lower-power motorized vehicles, this results in considerable losses which considerably impairs the efficiency of the transmission line.

Infinitely adjustable, dry-running belt drives have been used for some time in industrial transmissions mainly for the rotational speed adjustment. During the operation, the adjustment of the ratio usually takes place by the rotation of a hand wheel. Because of the higher efficiency, it is only the consequent separation of functions in the case of the composite V-belt which permits the use in motor vehicle transmissions.

When a dry-running composite V-belt is used—as described by Amijima, Fujii, Matuoka and Ikeda in "Study on Axial Force and Its Distribution for a Newly Developed Block-Type CVT-Belt" (*Int. J. of Vehicle Design*, Vol. 12, No. 3, 1991-, because of the changed conditions in the frictional contact, that is, because of the higher coefficient of friction, correspondingly lower contact pressure forces are required. The theoretical principles as well as the explanation of the so-called self-locking effect are discussed in detail in a 1993 dissertation by Pietz at the University of Hannover concerning the topic "Operating Behavior of CVT-Belt Drives for the Driving of Automobiles".

In the case of dry-running belt transmissions, because of the lower required contact pressure forces, a hydraulic contact pressure of the wind-around medium is no longer necessary but can be replaced by a mechanical contact pressure and adjusting device.

An object of the present invention is to essentially relieve the V-belt of an infinitely variable speed transmission from additional forces which are actually not required for transmitting the driving power of the driving engine through the transmission.

This and other objects have been achieved according to the present invention by providing an infinitely variable speed transmission comprising: a first and a second V-belt pulley arranged on a first and a second transmission shaft, respectively, each of said V-belt pulleys having an axially fixed pulley part and an axially movable pulley part; a continuous V-belt wound around said first and said second V-belt pulleys, said V-belt having generally axially-facing friction surfaces which contact respective friction surfaces of said V-belt pulleys to transmit a torque between said first and said second transmission shafts; a transmission ratio adjusting device coupled to said first V-belt pulley and comprising an adjusting motor, said transmission ratio adjusting device being configured to vary an axial distance between said axially fixed pulley part and said axially movable pulley part of said first V-belt pulley to change an effective diameter of said V-belt to vary a transmission ratio between said first transmission shaft and said second transmission shaft, said transmission ratio adjusting device being configured to generate a variable contact pressure force between said friction surfaces of the first V-belt pulley and said friction surfaces of the V-belt as a function of at least one outside operating parameter; a first contact pressure adjusting device coupled to said first V-belt pulley and comprising contact pressure cams, said first contact pressure adjusting device being configured to generate an additional variable contact pressure force between said friction surfaces of the first V-belt pulley and said friction surfaces of the V-belt as a function of at least one of said torque and said transmission ratio; and a second contact pressure adjusting device comprising contact pressure cams coupled to said second V-belt pulley, said second contact pressure adjusting device being configured to generate a variable contact pressure force between said friction surfaces of the second V-belt pulley and said friction surfaces of the V-belt as a function of at least one of said torque and said transmission ratio, wherein the sum of said contact pressure force generated by said transmission ratio adjusting device and said additional contact pressure force generated by said first contact pressure adjusting device is equal to said contact pressure force generated by said second contact pressure adjusting device.

The invention is based on the fact that the transmission of the peripheral forces and the effect of the adjusting forces concern different areas of the winding-around.

The winding around the two V-belt pulleys can be divided into two force areas. After the V-belt enters into the driven V-belt pulley, the V-belt first moves through the rest bend in which no buildup of the belt end force takes place. It is only after the V-belt has passed the orthogonal point that a belt end force is built up at the driven V-belt pulley. The transmission of the belt end forces and thus of the torque therefore takes place in the so-called useful bend of the winding-around which results in the belt moving in toward the center of the driven V-belt pulley as the result of the longitudinal extension of the V-belt. Because of the longitudinal elasticity of the V-belt, a tensile force is reduced on the driving V-belt pulley in the useful bend as the result of the belt moving out away from the center.

If the transmission of the peripheral forces is implemented mainly in the useful bend of the winding-around, that is, in the running-out area, the application of an adjusting force has its effect in the so-called rest bend, that is, in the entering area.

During the adjusting operation to a larger effective diameter, an axial adjusting force must be applied which squeezes together the belt elements which are in the winding-around. As a result, the contact point between the V-belt and the V-belt pulley moves to a larger effective diameter. Because of the self-locking condition, the belt elements already wedged into the winding-around cannot move out of the wedge groove. As a result, the movement of the contact point does not affect the conditions of the V-belt in the useful bend.

During the adjustment to a smaller effective diameter, as a result of the relieving of the belt elements situated in the winding-around, the entering point of the contact point is displaced to smaller effective diameters.

Because of the fact that the events during the adjustment take place in the area of the entering point and the transmission of the tensile force takes place in the useful bend, that is, in the running-out area, these events may be considered independently of one another. This consideration forms the basis of the invention that the adjusting forces and the steady-state contact pressure forces can simply be added with respect to their amounts. Thus, in the steady-state operating condition, that is, when the wind-around transmission runs on a constant effective diameter, only the steady-state contact pressure force is in effect. If, in addition, an adjustment is to take place to a larger effective diameter, an additional adjusting force must be superimposed on the steady-state contact pressure force. That is, the absolute axial force onto the belt must be increased.

Reciprocally, for the adjustment to a smaller effective diameter, a negative adjusting force must be added to the steady-state contact pressure force. This negative adjusting force must not be applied abruptly in order to prevent the V-belt from slipping.

With respect to the efficiency and the useful life of the V-belt, the transmission according to the invention has a significant advantage because the gearing does not take place by means of a position control, as in the prior art, but by means of a force control. In this case, the contact pressure forces on the two V-belt pulleys can be generated independently of one another and are selected to be only as large as required for the transmission of the required torque.

In the case of the infinitely variable speed transmission according to the invention, the transmission ratio occurs corresponding to the equilibrium of the contact pressure forces on the two V-belt pulleys. The contact pressure system on one—for example, the driven V-belt pulley applies the contact pressure force required for the respective operating point as a function of the torque and of the transmission gearing.

The generating of the total contact pressure force on the other—for example, the driving—V-belt pulley takes place by way of two contact pressure units. In this case, a portion of the contact pressure force is applied by a mechanical contact pressure system, such as a cam contact pressure system, which adjusts the contact pressure force as a function of the torque and of the gearing. The second portion of the total contact pressure force is applied by another contact pressure system which generates a contact pressure force from an auxiliary energy source. The sum of the two contact pressure forces will then be designed for the theoretically required total contact pressure force.

In one advantageous embodiment of the infinitely variable speed transmission of the present invention, the contact pressure forces on the two V-belt pulleys are generated by two contact pressure units respectively. On one—for example, the driven V-belt pulley—a contact pressure force is in each case applied according to the proportion by way of a torque-dependent cam contact pressure system and a contact pressure force by way of prestressed resilient devices. Also according to the proportion, a contact pressure force is applied on the other V-belt pulley by a torque-dependent cam contact pressure system and by an additional contact pressure and adjusting unit. Among others, electromechanical, pneumatic or hydraulic systems are contemplated as embodiments of this contact pressure and adjusting unit.

In another advantageous embodiment of the present invention applicable to dry-running wind-around transmissions, a hydraulic contact pressure system of the wind-around device may be eliminated and be replaced by a mechanical contact pressure and adjusting device.

These and other objects, features and advantages of the present invention will become more readily apparent from the following detailed description when taken in conjunction with the accompanying drawings.

BRIEF DESCRIPTION OF THE DRAWING

The sole drawing FIGURE shows a cross-sectional view of an infinitely variable speed transmission having two V-belt pulleys according to a preferred embodiment of the present invention.

DETAILED DESCRIPTION OF THE DRAWING

An infinitely variable speed transmission has a V-belt pulley 3 which is arranged on a first transmission shaft 1 (input shaft) and which, by way of a continuous V-belt 11, in a known manner, is in a driving connection with a V-belt pulley 4 which is arranged on a second transmission shaft 2 (output shaft).

The V-belt pulley 3 has an axially-fixed pulley part 7, which is constructed in one piece with the transmission shaft 1, and a pulley part 9 which is arranged in a rotatably and axially movable manner with respect to the axis of rotation 5—5 of the transmission shaft 1. The pulley parts 7 and 9 are provided with one friction surface 12 and 13 respectively which are arranged in a wedge shape with respect to one another and which are each in frictional contact with one of the two face-side friction surfaces 16 and 17 of the V-belt 11.

The V-belt pulley 4 has an axially-fixed pulley part 8, which is arranged with respect to the transmission shaft 2 in a manner which is fixed with respect to movements, as well as a pulley part 10 which is rotationally and axially movably arranged with respect to the axis of rotation 6—6 of the transmission shaft 2. The pulley parts 8 and 10 are provided with one friction surface 14 and 15 respectively which are arranged in a wedge shape with respect to one another and which are each in frictional contact with one of the two friction surfaces 16 and 17 of the V-belt 11.

A first adjusting device 25 on the V-belt pulley 4 operates according to the principle of generating a contact pressure force on the friction surfaces 14 and 15 from the torque transmitted by way of a curved path 27 of an adjusting sleeve 28 and a cam 24, for example as shown and described in Sakakibara, U.S. Pat. No. 4,541,821. The amount of this contact pressure force is determined by the size of the torque as well as by the slope of the curved path 27 assigned to the respective gearing which, on the V-belt pulley 4 is defined by the mutual distance 23 between the pulley parts 8 and 10 and, on the V-belt pulley 3, is defined by the mutual distance 22 between the pulley parts 7 and 9. In this case, the cams 24 are supported on a supporting pulley 30 which is provided with a corresponding curved contour 29 and which is stationarily fastened on the transmission shaft 2 by way of fastening devices 31 so that the contact pressure forces and their reaction forces are absorbed by the transmission shaft 2 and therefore do not affect the shaft bearing. The cams 24 are accommodated in a cage 32 which is disposed to be freely rotatable by itself in order to be able to react correspondingly in the case of a reversal of the direction of the torque.

For generating a further proportion of the contact pressure force on the V-belt pulley 4, a second adjusting device is provided in the form of a prestressed pressure spring 26 (prestressed resilient device) which primarily has the task of ensuring a minimum prestressing of the V-belt 11 at any point in time. This relates mainly to the conditions before the starting operation because at that time no contact pressure force exists by way of the cam contact pressure system. In order not to hinder the relative rotation of the pulley parts 8 and 10, an axial bearing is provided at the intersection point between the pulley part 10 and the pressure spring 26.

The generating of the total contact pressure force required on the driving V-belt pulley 3 is carried out proportionately by an adjusting device 19 working with the cam contact pressure system and by an electromechanical adjusting device 20.

As mentioned above in the example of the driven V-belt pulley 4, the transmission of the contact pressure proportion by way of the cams 18 of the adjusting device 19 takes place as a function of the gearing and the torque. The electromagnetically generated proportion of the contact pressure force is generated by way of the holding moment occurring on a stepping motor 21. The contact pressure from the motor 21 can be controlled as a function of at least one outside operating parameter. A transmission connected on the output side transmits the reduced engine torque to a cam cage 33 which is provided with a gear ring and which receives the cams 39 which, on the one hand, are supported by way of a curved path 34 of a housing part 35 of the transmission housing 36 and, on the other hand, are supported by way of a curved path 37 of an adjusting ring 38 uncoupled from the rotational speed. As the result of the functional relationship between the position of the cams 18, that is, the gearing and the slope in the respective concerned point, the course of the contact pressure force can be designed in an almost arbitrary manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An infinitely variable speed transmission comprising:
    a first and a second V-belt pulley arranged on a first and a second transmission shaft, respectively, each of said V-belt pulleys having an axially fixed pulley part and an axially movable pulley part;
    a continuous V-belt operatively connecting said first and said second V-belt pulleys, said V-belt having generally axially-facing friction surfaces which contact respective friction surfaces of said V-belt pulleys to transmit a torque between said first and said second transmission shafts at a variable transmission ratio therebetween;
    a first contact pressure adjusting device operatively connected to the axially movable pulley part of said first V-belt pulley, said first contact pressure adjusting device being configured to generate a first variable contact pressure force on the axially movable pulley part of said first V-belt pulley as a function of at least one outside operating parameter;
    a second contact pressure adjusting device operatively connected to the axially movable pulley part of said first V-belt pulley, said second contact pressure adjusting device being configured to generate a second variable contact pressure force on the axially movable pulley part of said first V-belt pulley as a function of at least one of said torque and said transmission ratio, said first and said second contact pressure adjusting devices being separately connected to said axially movable pulley part of said first V-belt pulley such that said first and said second contact pressure forces act separately on said axially movable pulley part of said first V-belt pulley; and
    a third contact pressure adjusting device operatively connected to the axially movable pulley part of said second V-belt pulley, said third contact pressure adjusting device being configured to generate a first variable contact pressure force on the axially movable pulley part of said second V-belt pulley as a function of at least one of said torque and said transmission ratio.

2. Transmission according to claim 1, wherein said third contact pressure adjusting device is configured to vary an axial distance between said axially fixed pulley part and said axially movable pulley part of said second V-belt pulley to change an effective diameter of said V-belt to vary said transmission ratio.

3. Transmission according to claim 2, further comprising at least one prestressed resilient device which is coupled with said second V-belt pulley to generate a constant contact pressure force between said friction surfaces of the second V-belt pulley and said friction surfaces of the V-belt.

4. Transmission according to claim 3, wherein the friction surfaces are operated dry.

5. Transmission according to claim 2, wherein the friction surfaces are operated dry.

6. Transmission according to claim 1, wherein the friction surfaces are operated dry.

7. Transmission according to claim 1, further comprising at least one prestressed resilient device which is coupled with said second V-belt pulley to generate a constant contact pressure force between said friction surfaces of the second V-belt pulley and said friction surfaces of the V-belt.

8. Transmission according to claim 1, wherein a total contact pressure force on said first V-belt pulley including said first variable contact pressure force and said second variable contact pressure force is equal to a total contact pressure force on said second V-belt pulley including said first variable contact pressure force on said axially movable part of said second V-belt pulley.

9. An infinitely variable speed transmission comprising:

a first and a second V-belt pulley arranged on a first and a second transmission shaft, respectively, each of said V-belt pulleys having an axially fixed pulley part and an axially movable pulley part;

a continuous V-belt wound around said first and said second V-belt pulleys, said V-belt having generally axially-facing friction surfaces which contact respective friction surfaces of said V-belt pulleys to transmit a torque between said first and said second transmission shafts;

a first contact pressure adjusting device comprising a motor, a cam cage, and a cam operatively connected between said axially fixed pulley part and said axially movable pulley part of the first V-belt pulley such that said first contact pressure adjusting device generates a first variable contact pressure force between said friction surfaces of the first V-belt pulley and said friction surfaces of the V-belt as a function of at least one outside operating parameter;

a second contact pressure adjusting device comprising a contact pressure cam operatively connected between said axially fixed pulley part and said axially movable pulley part of the first V-belt pulley such that said second contact pressure adjusting device generates a second variable contact pressure force between said friction surfaces of the first V-belt pulley and said friction surfaces of the V-belt as a function of at least one of said torque and said transmission ratio, said first and said second contact pressure adjusting devices being separately connected to said axially movable pulley part of said first V-belt pulley such that said first and said second contact pressure forces act separately on said first V-belt pulley; and a third contact pressure adjusting device comprising contact pressure cams operatively connected between said axially fixed pulley part and said axially movable pulley part of the second V-belt pulley such that said third contact pressure adjusting device generates a first variable contact pressure force between said friction surfaces of the second V-belt pulley and said friction surfaces of the V-belt as a function of at least one of said torque and said transmission ratio.

10. Transmission according to claim 9, further comprising at least one prestressed resilient device which is coupled with said second V-belt pulley to generate a constant contact pressure force between said friction surfaces of the second V-belt pulley and said friction surfaces of the V-belt.

11. Transmission according to claim 9, wherein a total contact pressure force on said first V-belt pulley including said first variable contact pressure force and said second variable contact pressure force is equal to a total contact pressure force on said second V-belt pulley including said first variable contact pressure force on said axially movable part of said second V-belt pulley.

* * * * *